April 27, 1937. W. J. YOUNG 2,078,359
PROCESS AND APPARATUS FOR COATING PARTICLES
Filed Oct. 19, 1935
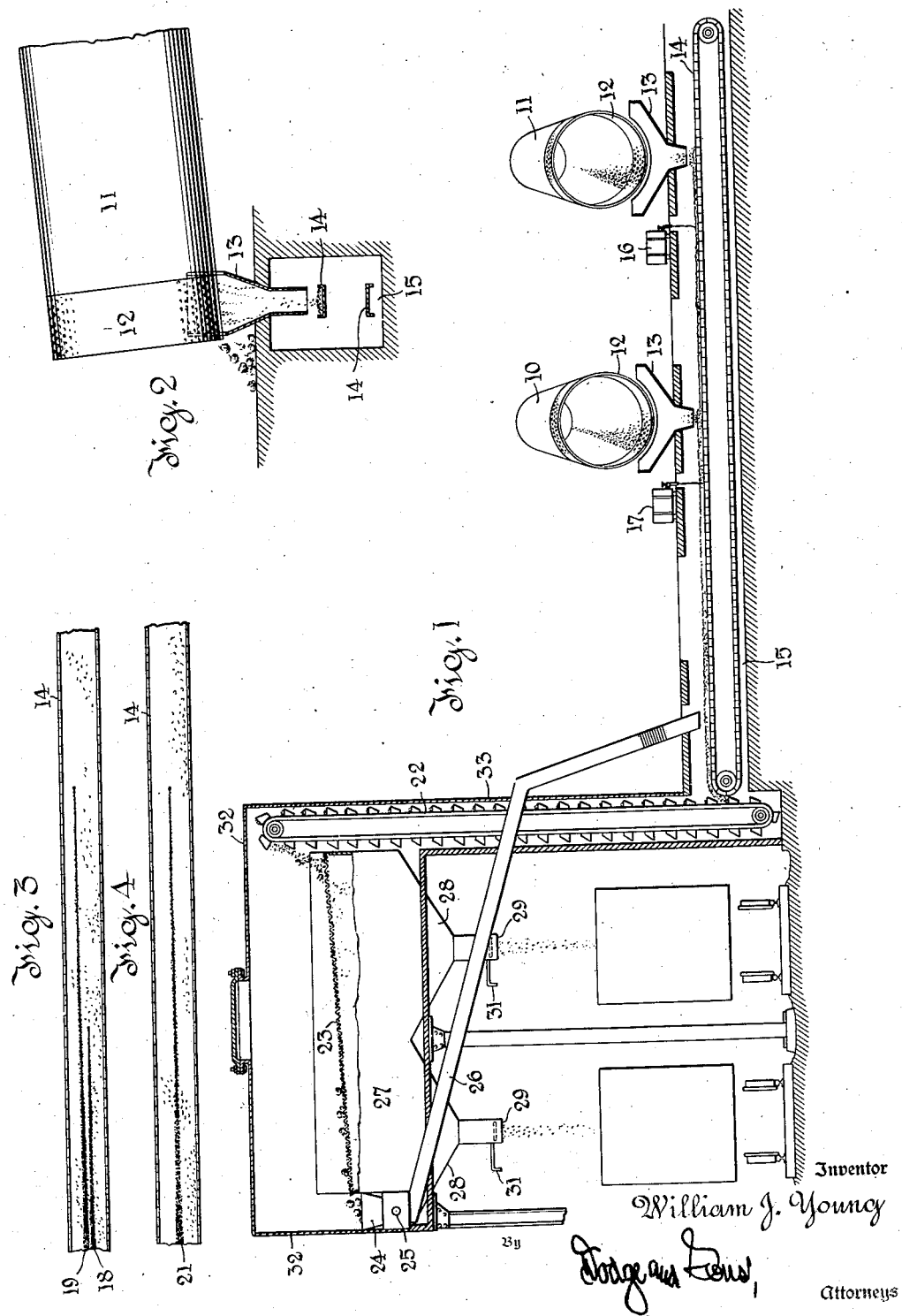
Inventor
William J. Young
By Dodge and Sons
Attorneys Patented Apr. 27, 1937

2,078,359

UNITED STATES PATENT OFFICE 2,078,359

PROCESS AND APPARATUS FOR COATING PARTICLES

William J. Young, Charles Town, W. Va., assignor to The Standard Lime and Stone Company, Baltimore, Md., a corporation of Maryland Application October 19, 1935, Serial No. 45,821

8 Claims. (Cl. 91—55)

This invention pertains to an improved method of and apparatus for applying dust allaying mediums to various bodies, and more particularly to the application of an oily material to particles of such substances which have a tendency to dust and thus become annoying to those persons who have to handle the same.

More specifically, the invention pertains to the application of an oil to such materials as furnace refractories, fluxes having a lime base and various other discrete particles which have a tendency to dust. For instance, refractories produced by burning dolomitic rock and iron oxide, and also fluxes likewise produced by similar treatment of a high calcium limestone and iron oxide, dust to a greater or less extent when handled and such dusting is annoying to the operators employing the materials.

The present invention provides a simple continuous process and apparatus for effectuating said process, whereby such materials, refractories, fluxes, and the like, may be mechanically handled and oiled, the latent heat of the material as it passes to a storage bin or ultimate point of discharge being utilized to bring about or effect a complete surface coating or surface pore impregnation as will allay the rising of any dust from any particle or mass of particles when the same is handled or thrown about.

Hereinafter and for the sake of brevity, the material will be referred to as particles or nodules, which are as a matter of fact the form it takes under the usual method of manufacture and which is herein adverted to insofar as it is necessary to an understanding of the present invention.

One form of apparatus by which the method has been successfully carried out on a commercial scale is illustrated in the annexed drawing, wherein:—

Figure 1 is a sectional elevation of the apparatus showing the discharge end of two rotary kilns and appurtenant apparatus elements for receiving the particles therefrom, applying oil thereto in a stream or streams, and conveying the material to a storage bin with which are or may be associated other apparatus elements;

Fig. 2, a vertical sectional elevation of the discharge end of one of the tubular kilns with the associated conveyor shown in section;

Fig. 3, a plan view of a section of the conveyor showing the particles thereon with a single spreading line or path of oil thereon; and Fig. 4, a like view illustrating two such lines.

It will, of course, be apparent to one skilled in the art that the drawing does not disclose the kilns 10 and 11 in detail. In the instant case, they are shown as of the rotary type having their discharge ends perforated, producing screen sections 12.

The particles which are too large to pass through the screen sections are discharged onto the floor, Fig. 2, for return to the kiln or otherwise.

The sized particles passing through the screen preferably pass into a hopper or funnel-shaped trough 13, the lower restricted end whereof stands above the upper run of an endless conveyor 14 preferably placed within a duct or conduit 15. In practice, such conduit has been formed in the cement floor of the plant and in a short while after the apparatus is put into operation, the walls of the conduit become heated so that both the conduit and the conveyor as a whole remain in a heated or warmed condition throughout.

The particles which are discharged through the screen openings pass into the funnel-shaped element or hopper 13 and are discharged in an even continuous layer upon the constantly driven conveyor 14.

The upper wall of the conduit 15 is open, at least in part, and means is provided for feeding a stream of oil or other dust allaying substance to the particles carried by the conveyor. In the instant case, the oil is shown as passing from receptacles 16 and 17, the spouts whereof are displaced laterally to each other and to the conveyor so that the oil is deposited on the particles along two separated lines indicated as 18 and 19 in Fig. 3. Of course, but a single line application may be made, as is indicated at 21 in Fig. 4, in which case but a single receptacle or conduit is employed to discharge the dust allaying medium upon the particles.

Where the dust allaying material is of an oily nature, it has a tendency to spread laterally to each side of the line of application, as is indicated in both Figs. 3 and 4, that is to say, this area which is covered by the oil widens out as the particles approach the discharge end of the conveyor. This "spread" is due to the fluidity of the oil; which fluidity is increased by the latent heat of the particles.

Immediately adjacent the discharge end of the upper run of the conveyor 14 is a bucket conveyor 22 to which rapid motion is imparted, the particles passing from the conveyor 14 into the buckets and being carried upwardly thereby and preferably discharged on a separator or screen denoted by 23. Any coarse or large particles are discharged from the screen into a hopper 24 located above a grinder or crusher 25, the discharge end whereof is connected with a conduit 26. This tube or conduit 26 extends over into the conduit 15 above the conveyor 14, and the material passing therethrough is discharged onto the conveyor and is again carried upwardly by the bucket conveyor.

It will, of course, be appreciated that in the broader aspect of the invention, these coarse particles may be disposed of without returning them to the conveyor 14.

Screen 23 is mounted in the upper portion of a chamber or receptacle 27, the lower portion of which is formed into two hopper-like elements 28 having discharge spouts 29 controlled by slides or valves 31. The chamber 27, the upper portion of the bucket conveyor, the crusher and its allied hopper, are all mounted within a closed housing 32 which has a downwardly extending leg 33 in which the bucket conveyor is housed. This member 33 tends to convey any heat which may emanate from the conduit 15 upwardly into the housing 32 so that all of the particles which are oiled, as shown in Fig. 3 or in Fig. 4, are maintained in a hot condition as they are carried upwardly into the normally closed housing or chamber 32 and dumped onto the screen 23. The particles are, of course, agitated as they pass to and from the conveyer 22 and a further agitation and admixing takes place upon the screen, insuring close contact between the oiled and non-oiled particles, with the result that all of the particles become oiled through direct contact and absorption. Withdrawal through spouts 29 also sets up agitation within the mass.

The latent heat of the particles acts to increase the fluidity of the oil, as well as to vaporize the same to a greater or less extent, and as the particles pass over the screen, into and through the receptacle 27 located within the normally closed chamber 32, the oiled particles which are still hot, contact the other and unoiled hot particles and the result is that when the mass is discharged through the spouts, it will be found that all the particles are fully coated or oiled. When the apparatus is constantly running, the temperature obtaining within the housing 32 is approximately 250° F.–350° F.

The coating of the particles obtained in this manner is so light that while it will allay the dust, it is imperceptible to the touch. A certain amount of the oil vapor undoubtedly enters the pore space adjacent the surface of those particles which are initially unoiled, and in this way is absorbed thereby. Being applied while the material is hot and held in storage, so to speak, as within the housing 32, the vapor has an opportunity to come into contact with the mass in its entirety, hence the particles as they pass outwardly from the spouts 31 to the cars or the like placed therebelow, will be found to be evenly treated and in such condition that the handling thereof is not objectionable, either from the rising of any dust or the offgiving of any oil from the surface of the particles.

Insofar as the generic invention is concerned, the kilns do not necessarily have to be of the rotary type, although this type lend themselves to speedy operation, thus vertical stills could be utilized, the material raked out and the larger pieces separated from the fine particles, which latter would be delivered in one way or another to the endless conveyor 14 preparatory to the placement of the oil thereon.

The term "oil" is used herein in the generic sense and while it is preferable to use an oil of commerce which does not necessarily have to be modified in any sense, various bituminous materials, including petroleums, petroleum products, tars and tar products, may be employed.

When speaking of oiling the particles as they are moved forward by the conveyor 14 toward the end of its run, it will be appreciated that only sufficient oil will be applied thereto as will coat the same in the manner above set forth. In other words, the amount of oil is such that if the particles were left standing in quiescent condition and allowed to cool, they would doubtless not be properly oiled and the oiling would not be effective for a material length of time. By treating the heated particles in the manner above specified, the film of oil which is deposited upon or taken up by each particle is substantially even and the surface as a whole is protected against dusting and from atmospheric influences.

It is apparent, of course, that a single kiln, as above stated, may be employed, or two or more kilns may be employed in conjunction with the conveyor 14. Furthermore, instead of employing the bucket conveyor, the conveyor 14 might discharge directly into the chamber 32 onto a screen as 23, provided, of course, said chamber is at a level lower than that of the upper run of the conveyor 14. The showing in the drawing is predicated upon actual commercial construction and enables one to oil the material and load it directly into cars below the chutes 29.

It is evident that insofar as the method is concerned it may be carried out by apparatus other than that herein shown, so long as the fundamentals of the process are present.

What is claimed is:

1. That method of imparting a surface coating of oil to a mass of normally dusty particles, which consists in heating said particles, applying oil to a portion only of said particles and while they are still hot, and confining the entire mass of oiled and unoiled particles in an admixed state while still hot, whereby the latent heat of the particles increases the fluidity of the oil and the oil is caused to spread over and coat the initially unoiled particles.

2. That method as set forth in claim 1, wherein the entire mass of oiled and unoiled particles is subjected to an admixing action prior to confining the same.

3. That method of oiling dusty particles, which comprises discharging the particles while hot upon a traveling conveyer and simultaneously separating the oversize particles from the mass, applying oil to a restricted area of the normal size particles which have been separated from the oversize particles, and discharging such separated particles both oiled and unoiled simultaneously into a closed chamber while said particles are still in a heated condition.

4. That method of oiling a mass of dusty particles, which comprises flowing oil upon a portion of such mass, screening the mass of oiled and unoiled particles, and storing the mass of particles thus treated in a chamber, whereby through the screening action the oiled and unoiled particles are brought into close and intimate contact and the unoiled particles will absorb oil.

5. In an apparatus for oiling dusty particles while hot, the combination of an endless traveling conveyor; at least one retort adapted to discharge hot particles upon said conveyor; means for feeding at least one stream of oil to the particles upon said conveyor as the conveyor is moved past the same; and means for storing the particles.

6. In an apparatus for oiling dusty particles while hot, the combination of at least one retort to produce said particles; an endless conveyor moving past the discharge of said retort; means for placing a stream of oil upon a portion of said particles as the conveyor is moving along beyond the retort; a storage chamber; and means for transferring the hot particles from the conveyor to the storage chamber.

7. A structure as set forth in claim 6, wherein a screen is provided for removing oversize particles which may be carried into the chamber.

8. A structure as set forth in claim 6, wherein a screen is provided for removing oversize particles which may be carried into the chamber, and a crusher is present for disrupting said particles.

WILLIAM J. YOUNG.